United States Patent
Lee

(10) Patent No.: US 11,131,375 B2
(45) Date of Patent: Sep. 28, 2021

(54) SIDE AXLE DISCONNECT

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 47 days.

(21) Appl. No.: 16/509,541

(22) Filed: Jul. 12, 2019

(65) Prior Publication Data

US 2021/0010580 A1  Jan. 14, 2021

(51) Int. Cl.

| | |
|---|---|
| F16D 41/06 | (2006.01) |
| F16H 48/34 | (2012.01) |
| F16D 15/00 | (2006.01) |
| B60K 23/08 | (2006.01) |
| B60K 23/04 | (2006.01) |
| B60K 17/35 | (2006.01) |
| B60K 17/16 | (2006.01) |
| F16H 48/08 | (2006.01) |

(52) U.S. Cl.
CPC ........... *F16H 48/34* (2013.01); *B60K 17/165* (2013.01); *B60K 17/35* (2013.01); *B60K 23/04* (2013.01); *B60K 23/0808* (2013.01); *F16D 15/00* (2013.01); *F16D 41/06* (2013.01); *F16H 2048/082* (2013.01)

(58) Field of Classification Search
CPC .... F16H 48/34; F16H 2048/082; F16D 41/06; F16D 15/00; F16D 41/063; B60K 23/0808; B60K 23/04; B60K 17/35; B60K 17/165; B60K 17/3515; B60K 17/02; B60K 17/043; B60K 2007/0046; B60K 2007/0061; B60K 7/0007; B60L 15/2054

See application file for complete search history.

(56) References Cited

U.S. PATENT DOCUMENTS

| | | | | |
|---|---|---|---|---|
| 5,142,943 A | * | 9/1992 | Hughes | F16D 43/215 192/49 |
| 2014/0332335 A1 | * | 11/2014 | Strong | F16D 15/00 192/43 |
| 2017/0227065 A1 | * | 8/2017 | Ince | F16D 41/063 |
| 2018/0038423 A1 | * | 2/2018 | Ohr | F16D 15/00 |
| 2019/0070955 A1 | | 3/2019 | Lee et al. | |

\* cited by examiner

*Primary Examiner* — Mark A Manley

(57) ABSTRACT

A disconnect including: an input hub; an output race including a radially inner surface with ramps; wedge plate segments radially disposed between the input hub and the output race, each segment including a ramp in contact with an outer race ramp; an actuator cage; and an actuator plate. For a connect mode, the input hub, the wedge segments, and the output race transmit torque from an electric motor of an electrically-powered vehicle to a wheel of the vehicle. In a disconnect mode, relative rotation between the input hub and the output race is enabled. To transition from the connect mode to the disconnect mode: the actuator plate is displaced by an actuator; the actuator plate axially displaces the actuator cage; and the actuator cage circumferentially displaces the wedge plate segments to decrease or break frictional contact between the wedge plate segments and the input hub.

17 Claims, 13 Drawing Sheets

SIDE AXLE DISCONNECT

TECHNICAL FIELD

The present disclosure relates to side axle disconnect including a wedge plate clutch. The side axle disconnect can be placed in a drive train of a vehicle between a prime mover of the vehicle and a half-axle.

BACKGROUND

It is known to disconnect an electric drive axle from a vehicle wheel using a friction clutch pack or a splined dog clutch mounted between a gearbox and a half-axle of the vehicle.

SUMMARY

According to aspects illustrated herein, there is provided a side axle disconnect for an electrically-powered vehicle, including: an input hub arranged to non-rotatably connect to an axle of a drive train of the electrically-powered vehicle, and including a radially inner surface with a plurality of ramps; an output race arranged to non-rotatably connect to a half-axle of the drive train; a plurality of pairs of wedge plate segments radially disposed between the input hub and the output race, each wedge plate segment including a ramp in contact with a respective ramp of the plurality of ramps; an actuator cage; and a first actuator plate. For a connect mode of the side axle disconnect, the plurality of pairs of wedge plate segments is arranged to non-rotatably connect the input hub and the output race to transmit torque from an electric motor of the electrically-powered vehicle to a wheel of the electrically-powered vehicle connected to the half-axle. In a disconnect mode of the side axle disconnect, relative rotation between the input hub and the output race is enabled. To transition from the connect mode to the disconnect mode: the first actuator plate is arranged to be displaced in a first direction by an actuator; the first actuator plate is arranged to displace the actuator cage in a first axial direction; and the actuator cage is arranged to circumferentially displace the plurality of pairs of wedge plate segments to decrease a frictional contact between the plurality of pairs of wedge plate segments and the output race, or to break contact between the plurality of pairs of wedge plate segments and the output race.

According to aspects illustrated herein, there is provided a method of operating a side axle disconnect for an electrically-powered vehicle, including: for a connect mode of the side axle disconnect, non-rotatably connecting, with a plurality of pairs of wedge plate segments of the side axle disconnect, an input hub of the side axle disconnect with an output race of the side axle disconnect, each pair including a first wedge plate segment and a second wedge plate segment, and transmitting torque from an axle, non-rotatably connected to the input hub, of a drive train of an electric motor of the electrically-powered vehicle through the side axle disconnect to a wheel of the electrically-powered vehicle connected to a half-axle of the drive train, the half-axle non-rotatably connected to the output race; and to transition from the connect mode to a disconnect mode of the side axle disconnect, displacing, with an actuator, a first actuator plate of the side axle disconnect in a first direction, displacing, with the first actuator plate and in a first axial direction, an actuator cage of the side axle disconnect, circumferentially displacing the first wedge plate segments and the second wedge plate segments, decreasing a frictional contact between the plurality of pairs of wedge plate segments and the output race, or breaking contact between the plurality of pairs of wedge plate segments and the output race, and enabling relative rotation between the input hub and the output race.

According to aspects illustrated herein, there is provided a side axle disconnect for an electrically-powered vehicle, including: an input hub arranged to non-rotatably connect to an axle of a drive train of the electrically-powered vehicle, and including a radially inner surface with a plurality of ramps; an output race arranged to non-rotatably connect to a half-axle of the drive train; a plurality of pairs of wedge plate segments radially disposed between the input hub and the output race; an actuator cage including a plurality of protrusions extending in a first axial direction; and an actuator plate. Each pair of wedge plate segments of the plurality of pairs of wedge plate segments includes a first wedge plate segment and a second wedge plate segment. Each first wedge plate segment includes a radially outer surface with a ramp in contact with a respective ramp of the plurality of ramps. Each second wedge plate segment includes a radially outer surface with a ramp in contact with a respective ramp of the plurality of ramps. For each pair of wedge plate segments, a protrusion of the plurality of the plurality of protrusions is disposed between the first wedge plate segment and the second wedge plate segment. For a connect mode of the side axle disconnect, the plurality of pairs of wedge plate segments is arranged to non-rotatably connect the input hub and the output race to transmit torque from an electric motor of the electrically-powered vehicle to a wheel connected to the half-axle. In a disconnect mode of the side axle disconnect, relative rotation between the input hub and the output race is enabled. To transition from the connect mode to the disconnect mode: the actuator plate is arranged to be displaced by an actuator in a first direction; the actuator plate is arranged to displace the actuator cage in a first axial direction; and the protrusion of the plurality of the plurality of protrusions is arranged to circumferentially displace the first wedge plate segment and the second wedge plate segment radially outwardly and away from each other to decrease a frictional contact between the plurality of pairs of wedge plate segments and the output race, or to break contact between the plurality of pairs of wedge plate segments and the output race.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
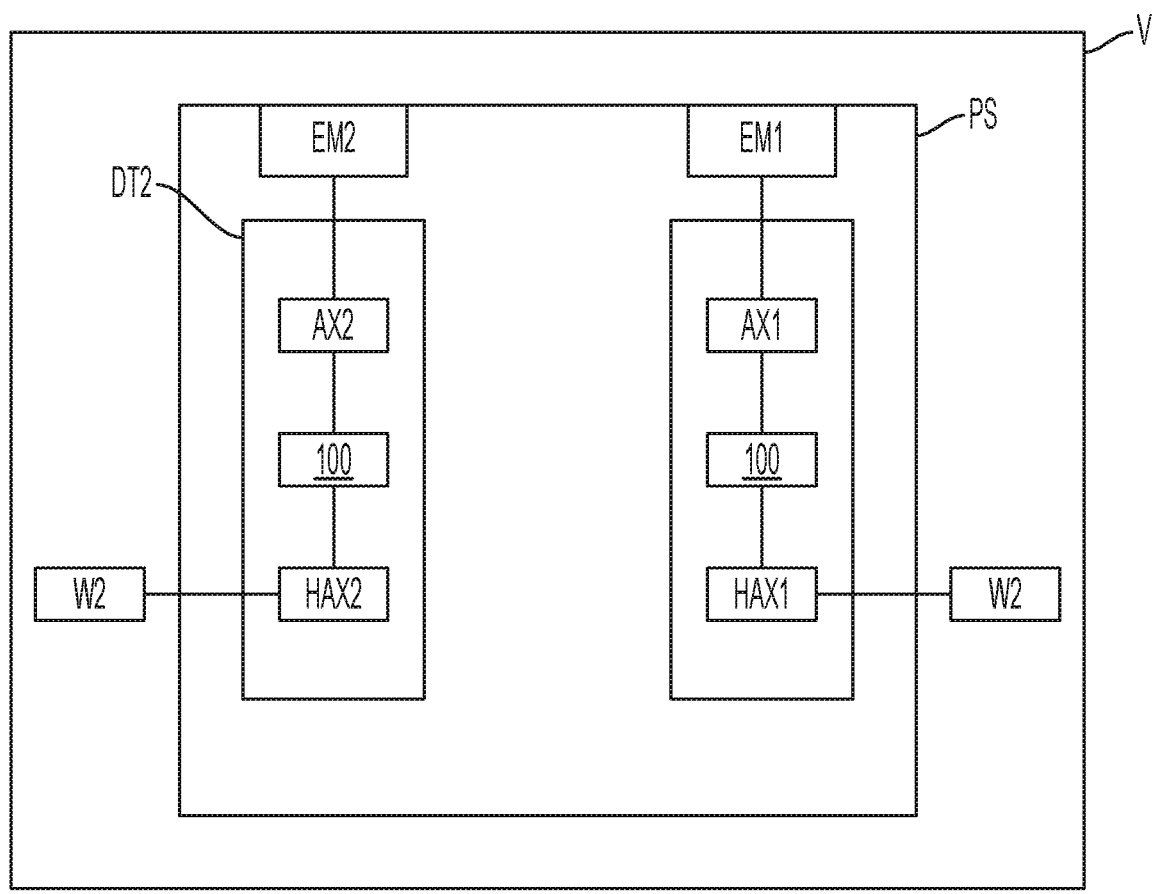
FIG. 1 is a schematic block diagram of an example propulsion system of an electrically-powered vehicle including side axle disconnects.

FIG. 1 is a schematic block diagram of example propulsion system PS of electrically-powered vehicle V including side axle disconnects 100.

Figure 2:
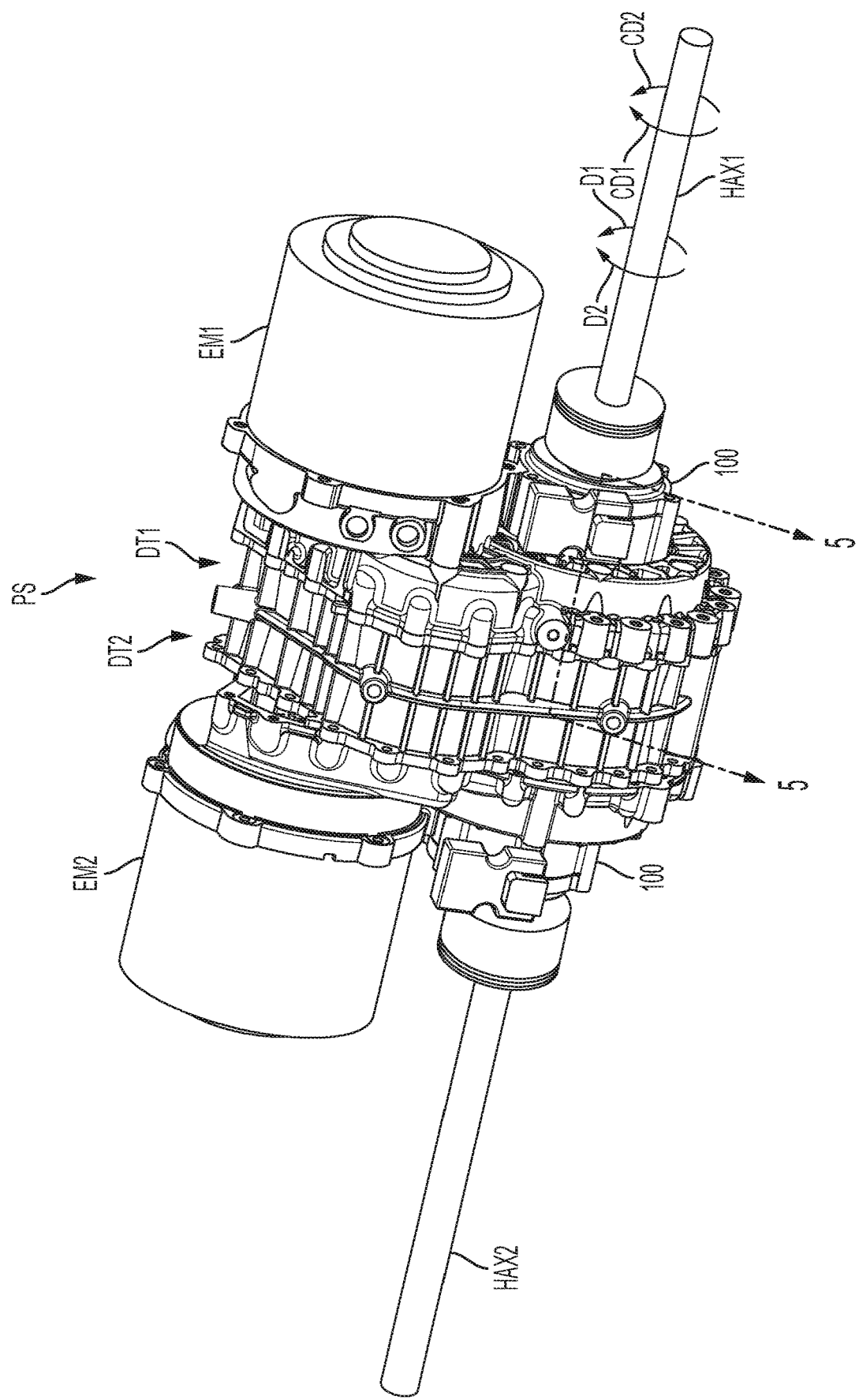
FIG. 2 is an isometric view of the propulsion system shown in FIG. 1.

FIG. 2 is an isometric view of propulsion system PS shown in FIG. 1.

Figure 3:
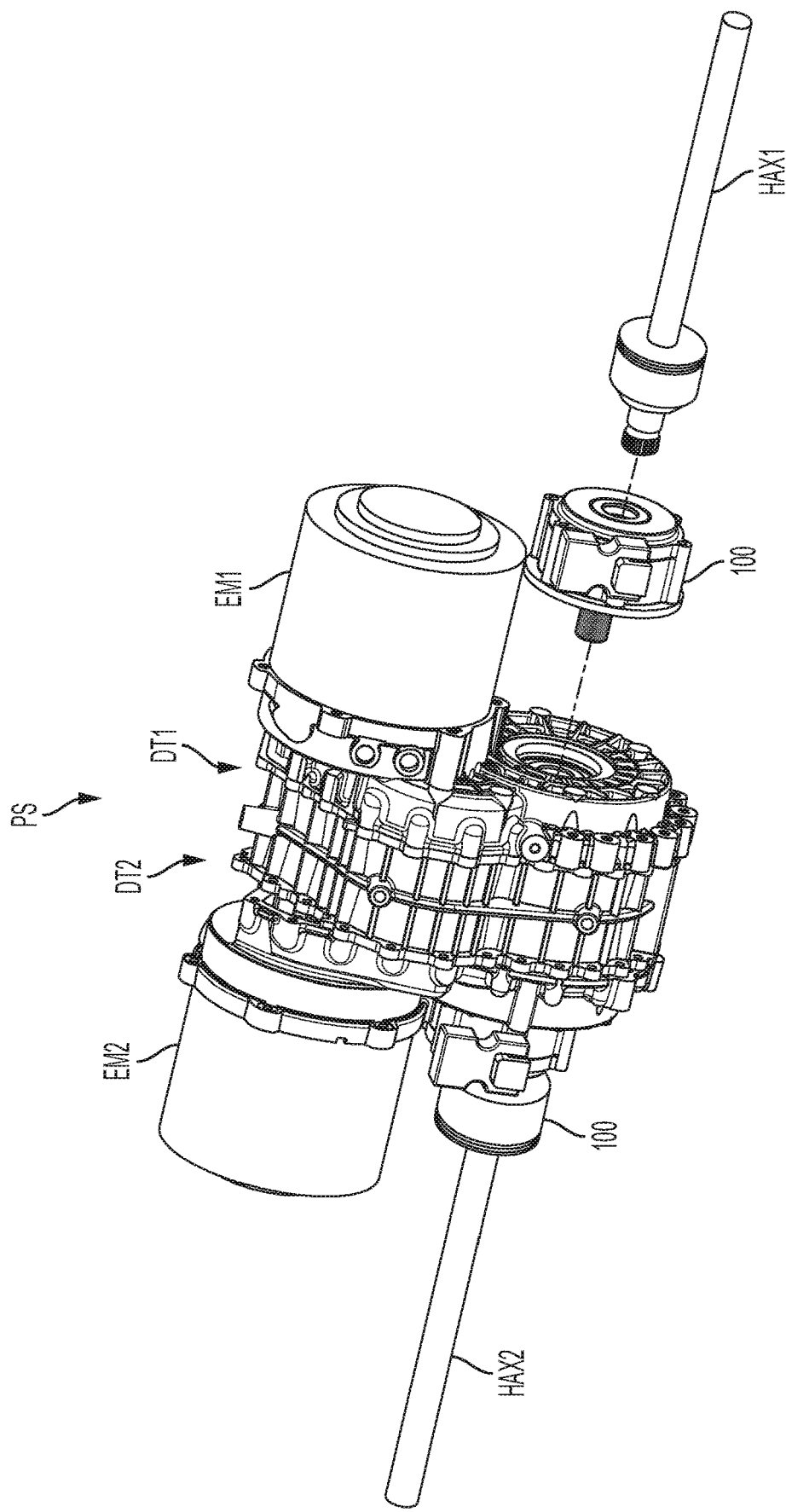
FIG. 3 is a partial exploded view of the propulsion system shown in FIG. 2.

FIG. 3 is a partial exploded view of propulsion system PS shown in FIG. 2.

Figure 4:
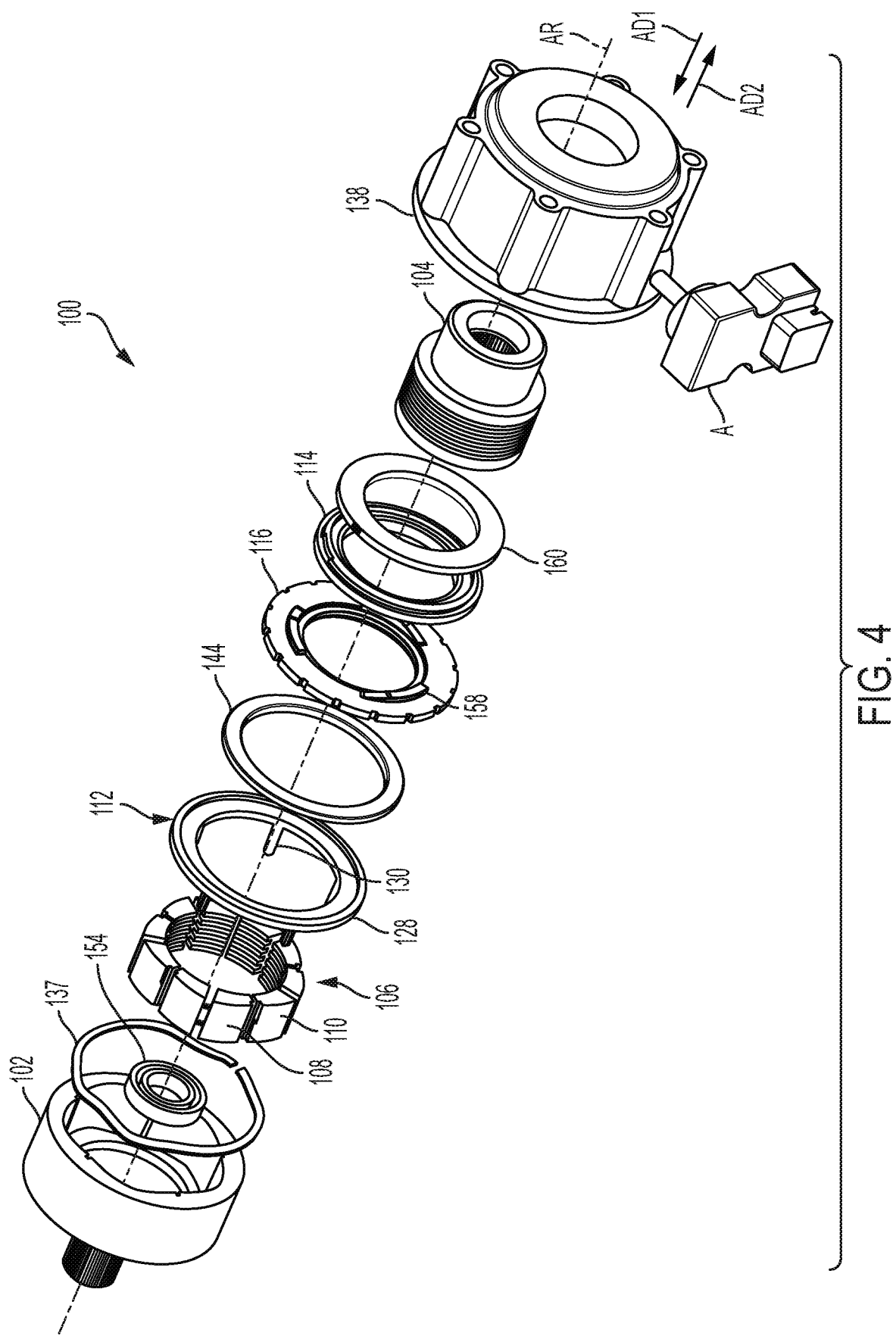
FIG. 4 is an exploded view of a side axle disconnect shown in FIG. 2.

FIG. 4 is an exploded view of a side axle disconnects 100 shown in FIG. 2.

Figure 5:
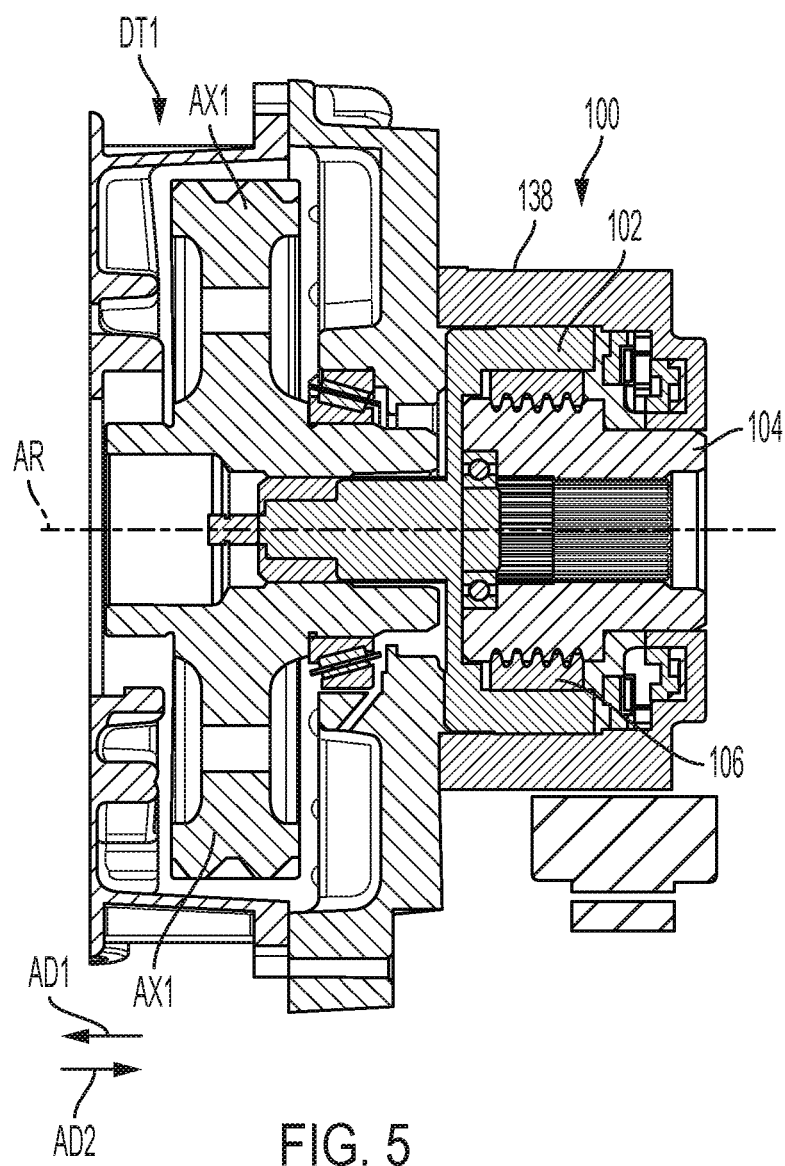
FIG. 5 is a cross-sectional view generally along line 5-5 in FIG. 2 with a half-axle removed.

FIG. 5 is a cross-sectional view generally along line 5-5 in FIG. 2 with a half-axle removed. The following should be viewed in light of FIGS. 1 through 5. Side axle disconnect 100 for an electrically powered vehicle, for example electrically-powered vehicle V, includes: input hub 102; output race 104; pairs 106 of wedge plate segments 108 and 110 (each pair 106 includes a segment 108 and a segment 110); actuator cage 112; and actuator plate 114. In an example embodiment, disconnect 100 includes actuator plate 116. In the example of FIGS. 1 and 2: input hub 102 is arranged to non-rotatably connect to an axle of a drive of an electrically-powered vehicle; and output race 104 is arranged to non-rotatably connect to a half-axle of the drive train. For example: for one of the disconnects 100 in FIG. 1, input hub 102 is arranged to non-rotatably connect to axle AX1 of drive train DT1 of propulsion system PS, and output race 104 is arranged to non-rotatably connect to half-axle HAX1 of drive train DT1; and for the other of disconnects 100 in FIG. 1, input hub 102 is arranged to non-rotatably connect to axle AX2 of drive train DT2 of propulsion system PS, and output race 104 is arranged to non-rotatably connect to half-axle HAX2 of drive train DT2.

Figure 6:
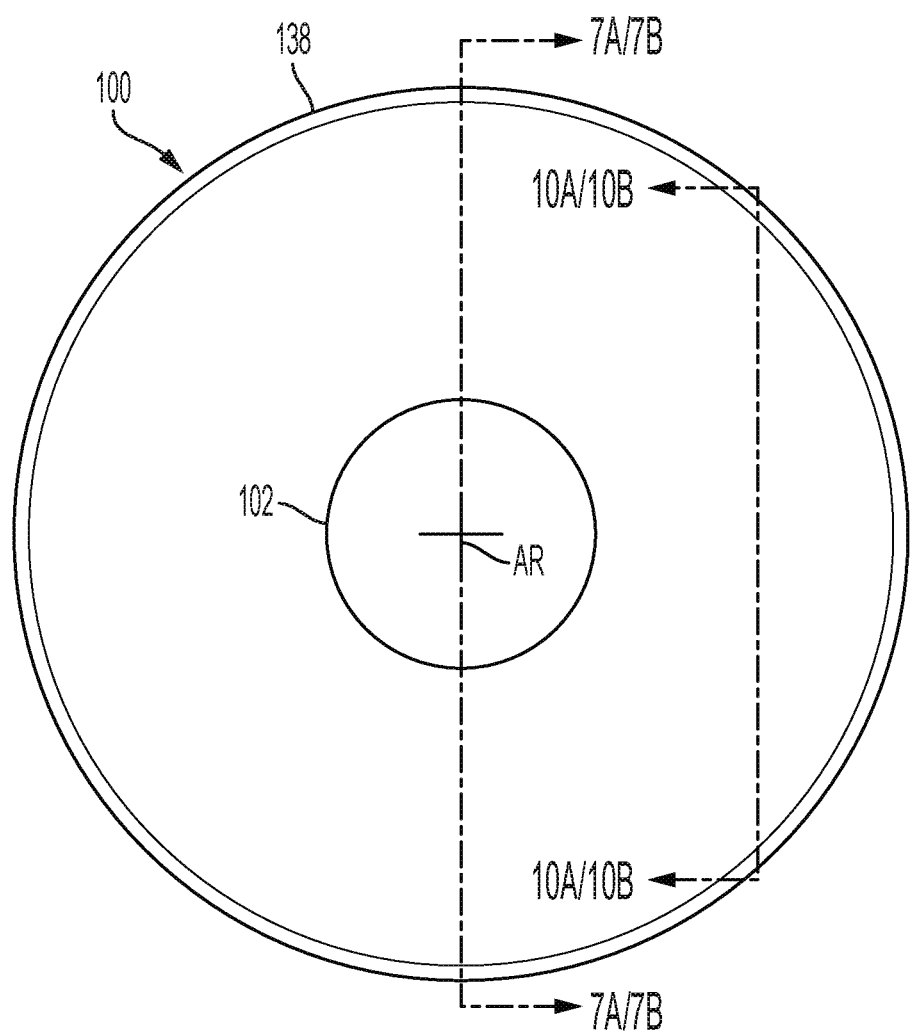
FIG. 6 is an end view of side axial disconnect shown in FIG. 2.

FIG. 6 is an end view of a side axial disconnect 100 shown in FIG. 2.

Figure 7A:
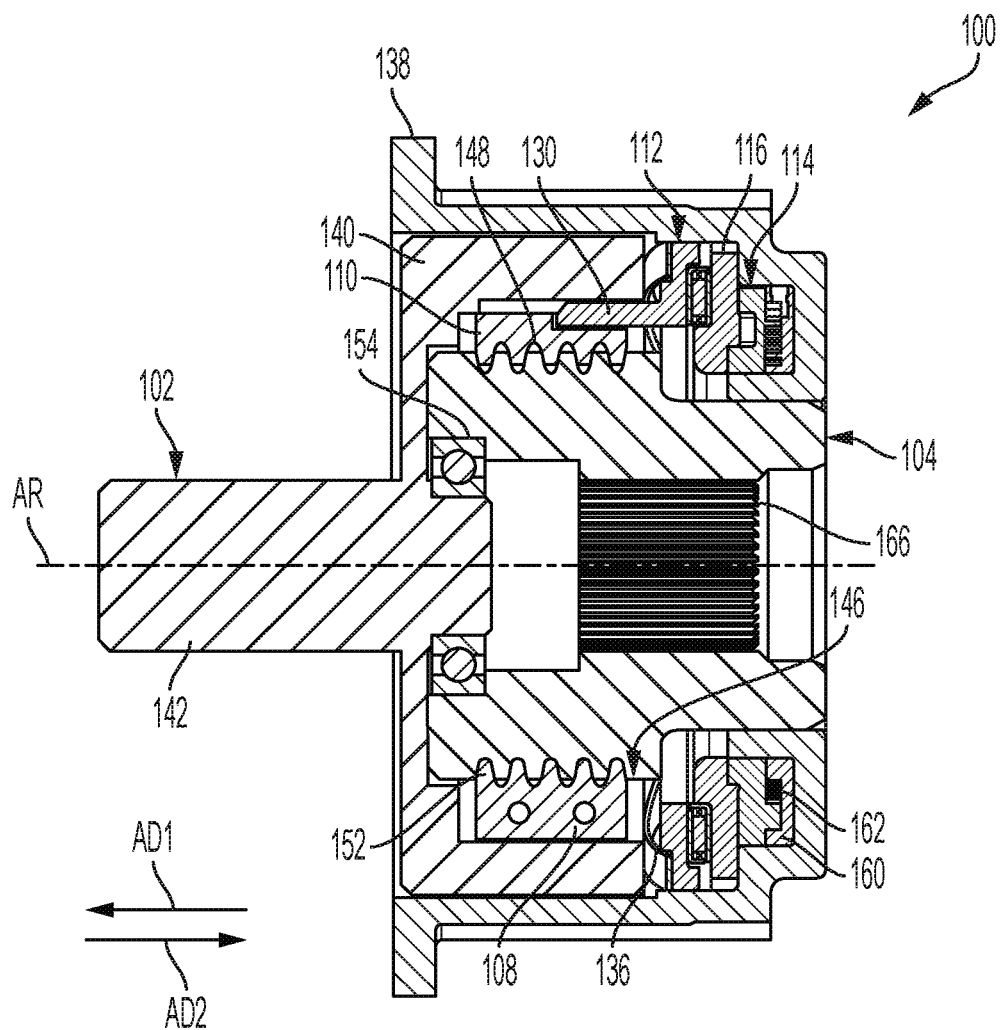
FIG. 7A is a cross-sectional view generally along line 7A/7B-7A/7B in FIG. 6 with the side axial disconnect in a connect mode.

FIG. 7A is a cross-sectional view generally along line 7A/7B-7A/7B in FIG. 6 with the side axial disconnect in a connect mode.

Figure 7B:
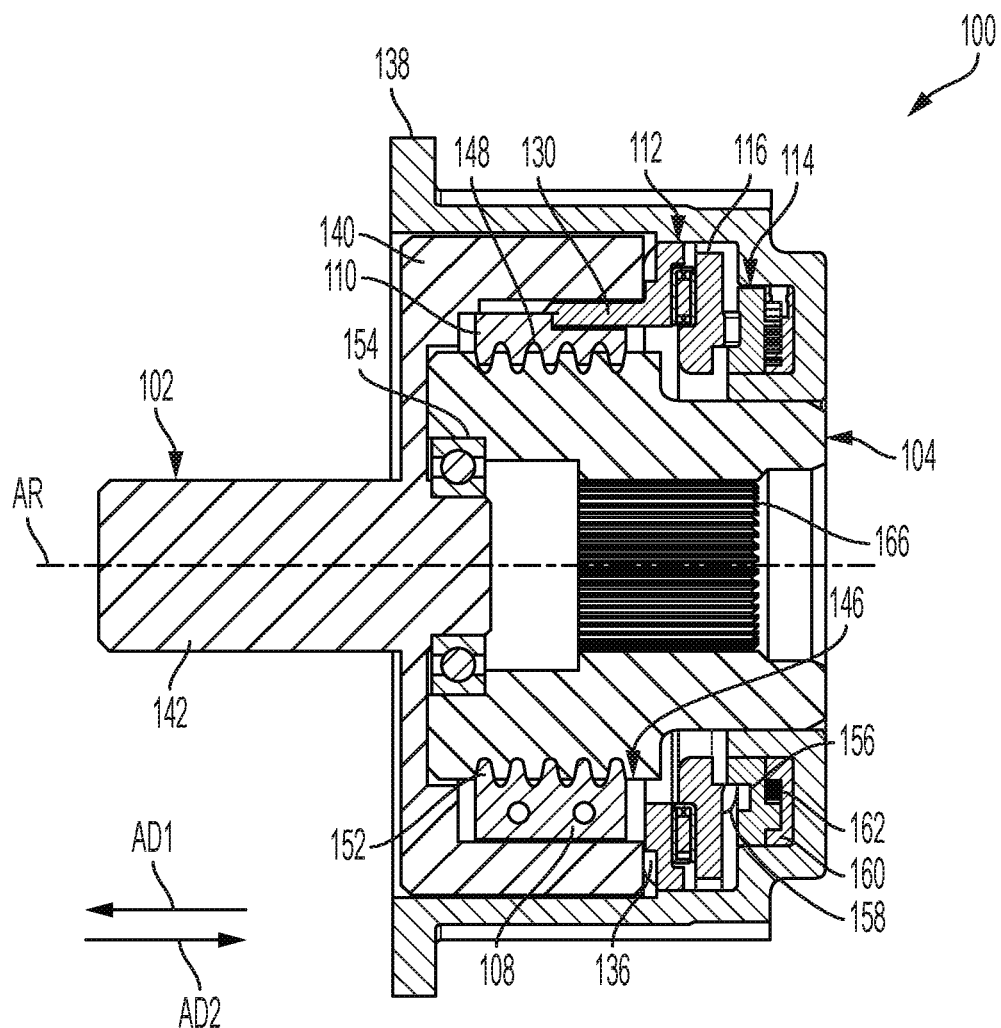
FIG. 7B is a cross-sectional view generally along line 7A/7B-7A/7B in FIG. 6 with the side axial disconnect in a disconnect mode.

FIG. 7B is a cross-sectional view generally along line 7A/7B-7A/7B in FIG. 6 with the side axial disconnect in a disconnect mode.

Figure 8:
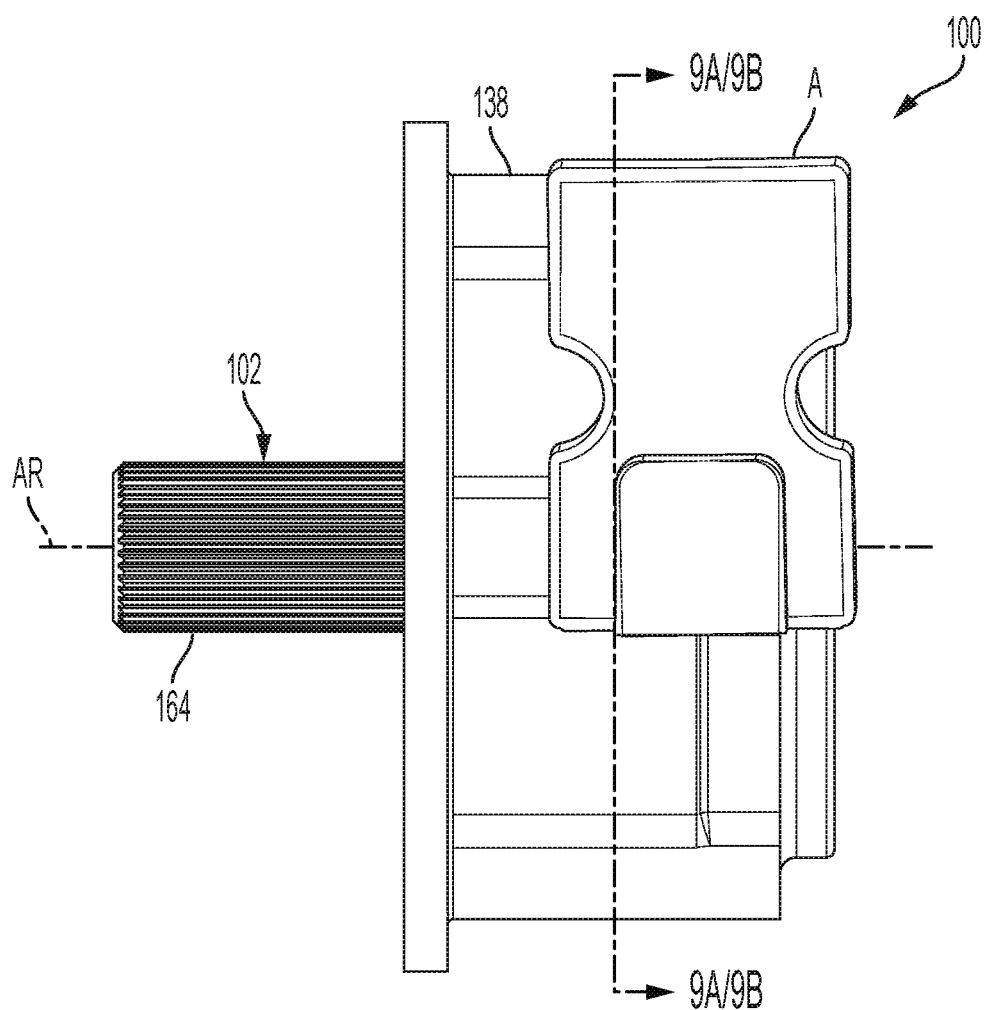
FIG. 8 is a side view of a side axial disconnect shown in FIG. 2.

FIG. 8 is a side view of a side axial disconnect 100 shown in FIG. 2.

Figure 9A:
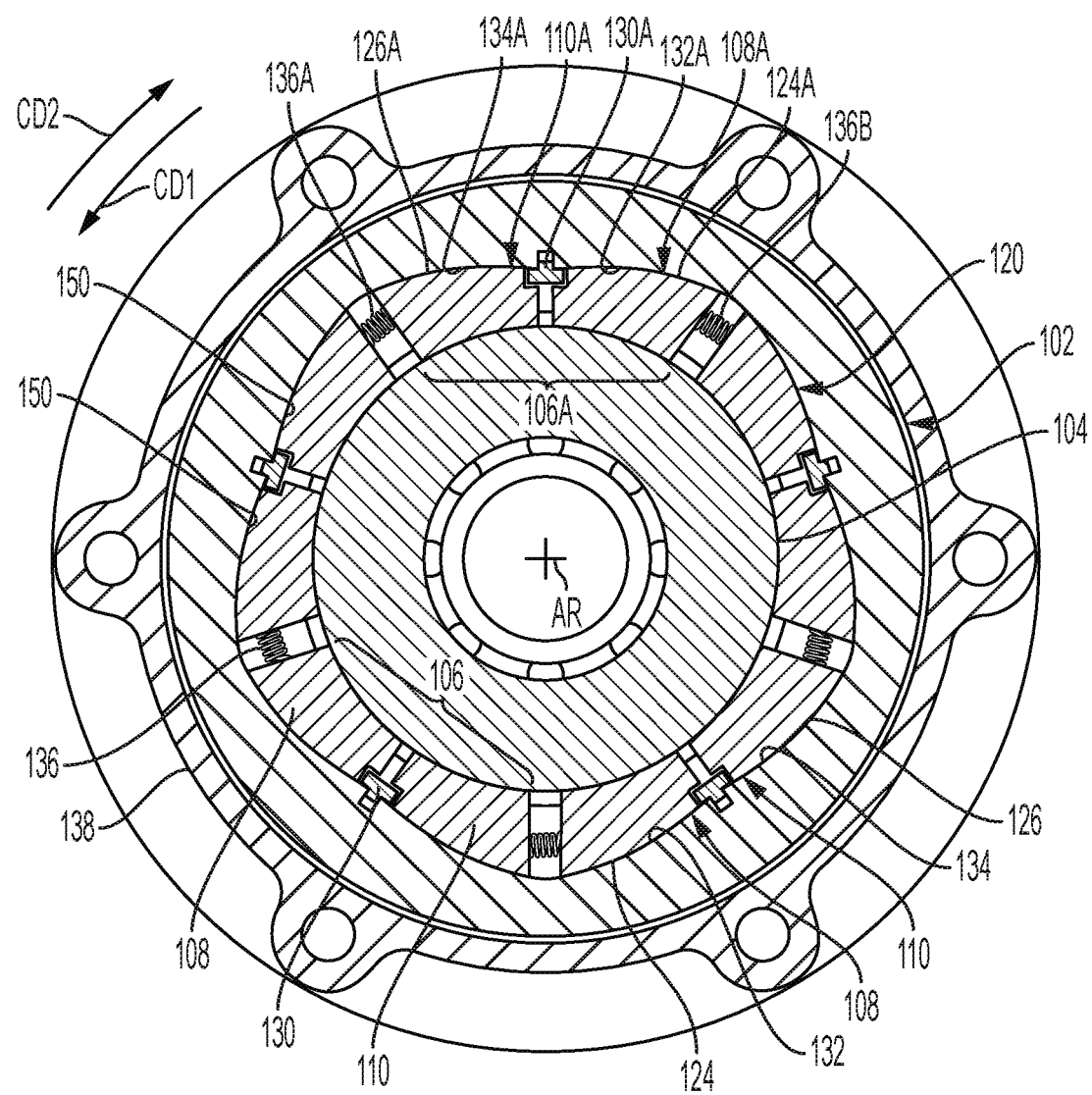
FIG. 9A is a cross-sectional view generally along line 9A/9B-9A/9B in FIG. 8 with the side axial disconnect in a connect mode.

FIG. 9A is a cross-sectional view generally along line 9A/9B-9A/9B in FIG. 8 with the side axial disconnect in a connect mode.

Figure 9B:
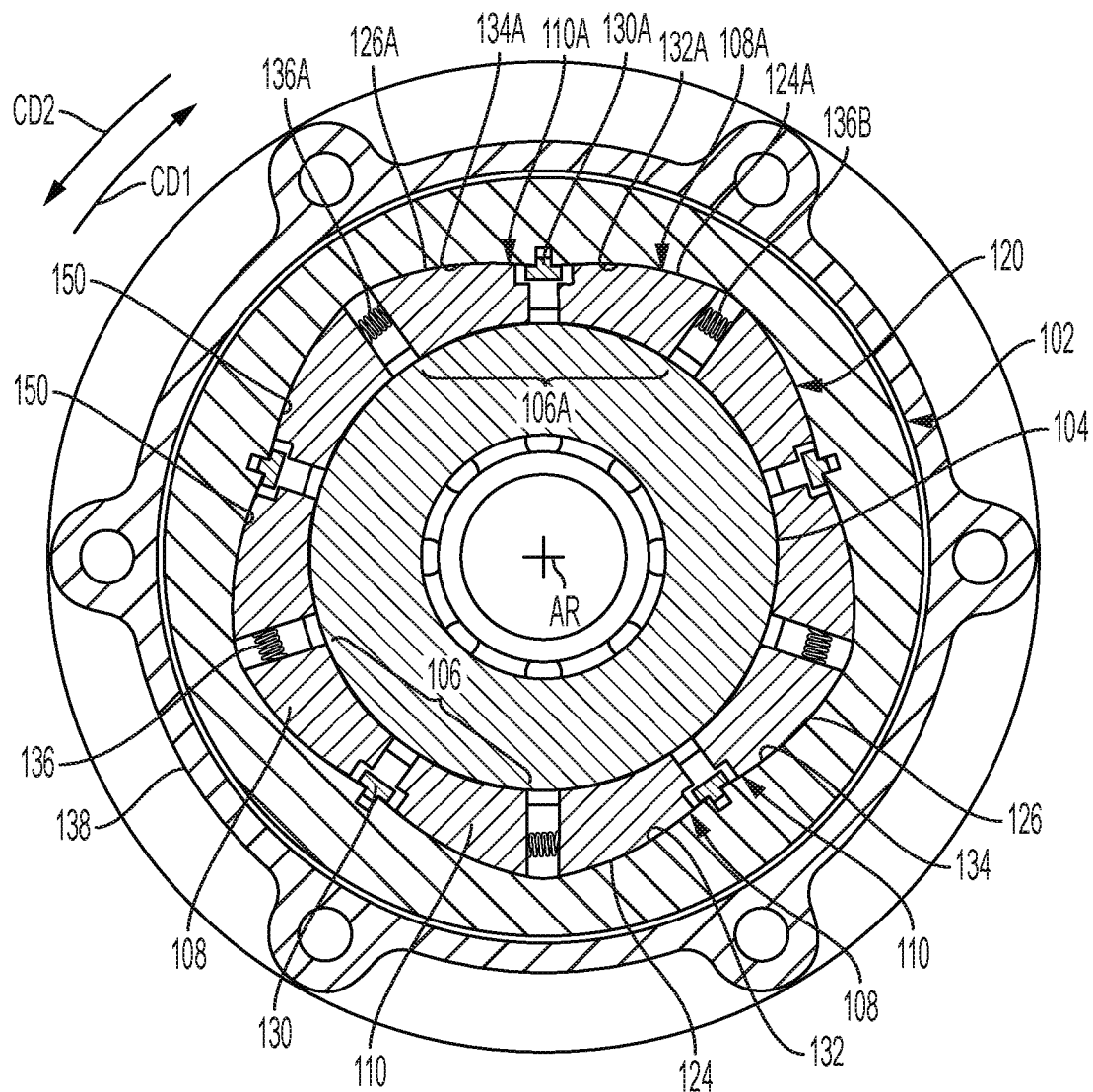
FIG. 9B is a cross-sectional view generally along line 9A/9B-9A/9B in FIG. 8 with the side axial disconnect in a disconnect mode.

FIG. 9B is a cross-sectional view generally along line 9A/9B-9A/9B in FIG. 8 with the side axial disconnect in a disconnect mode. The following should be viewed in light of FIGS. 1 through 9B. Input hub 102 includes radially inner surface 120 with ramps 124 and ramps 126 alternating in direction CD1. Wedge plate segments 108 and 110 are circumferentially adjacent and alternate in circumferential direction CD1. Pairs 106 are radially disposed between input hub 102 and output race 104. Note that the terms "disposed between" and "located between" are interchangeable.

For a connect mode of side axle disconnect 100, pairs 106 are arranged to non-rotatably connect input hub 102 and output race 104 to transmit torque from an electric motor (prime mover) of electrically-powered vehicle V to a wheel of vehicle V connected to a half-axle. For example: one of disconnects 100 in FIG. 1 is arranged to transmit torque from electric motor EM1 to wheel W1 via half-axle HAX1; and the other disconnect 100 in FIG. 1 is arranged to transmit torque from electric motor EM2 to wheel W2 via half-axle HAX2.

In a disconnect mode of side axle disconnect 100, relative rotation between input hub 102 and output race 104 is enabled and torque is not transmitted through disconnect 100. In the example of FIG. 2, to transition from the connect mode to the disconnect mode: actuator plate 114 is arranged to be displaced in direction D1, by actuator A; actuator plate 114 is arranged to displace actuator plate 116 in axial direction AD1, parallel to axis of rotation AR of disconnect 100; actuator plate 116 is arranged to displace actuator cage 112 in axial direction AD1 with respect to pairs 106, and actuator cage 112 is arranged to, for each pair 106, circumferentially displace wedge plate segments 108 and 110 to decrease a frictional contact between pairs 106 and output race 104, or to break contact between wedge plate segments 108 and 110 and output race 104. In an example embodiment, direction D1 is opposite direction CD1. Actuator A can be any actuator known in the art. In an example embodiment, side disconnect 100 includes actuator A.

Figure 10A:
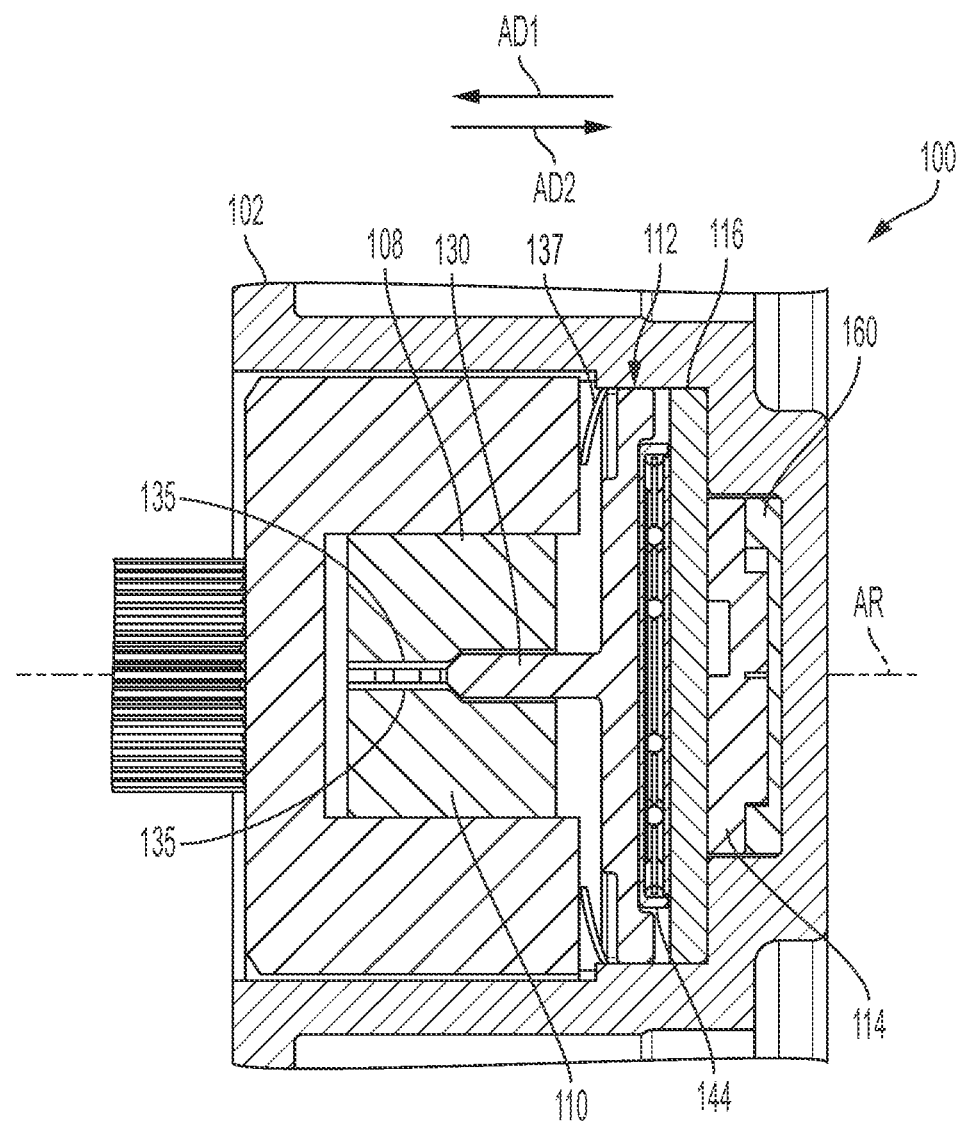
FIG. 10A is a cross-sectional view generally along line 10A/10B-10A/10B in FIG. 6 with the side axial disconnect in a connect mode.

FIG. 10A is a cross-sectional view generally along line 10A/10B-10A/10B in FIG. 6 with the side axial disconnect in a connect mode.

Figure 10B:
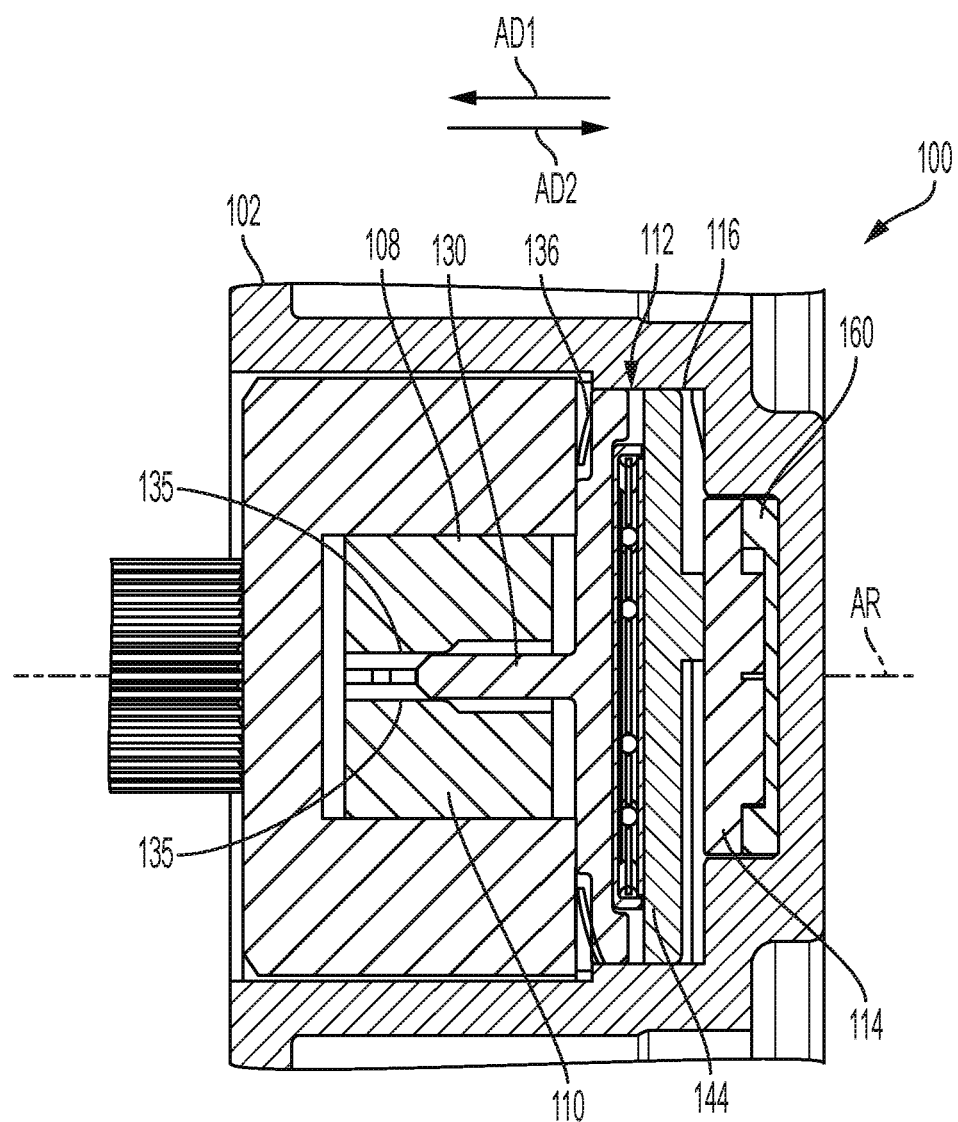
FIG. 10B is a cross-sectional view generally along line 10A/10B-10A/10B in FIG. 6 with the side axial disconnect in a disconnect mode.

FIG. 10B is a cross-sectional view generally along line 10A/10B-10A/10B in FIG. 6 with the side axial disconnect in a disconnect mode. The following should be viewed in light of FIGS. 1 through 10B. Actuation cage 112 includes annular portion 128 and protrusions 130 extending from annular portion 128 in axial direction AD1. Each protrusion 130 is circumferentially disposed between wedge plate segment 108 and wedge plate segment 110 for a respective pair 106. For example, protrusion 130A is circumferentially disposed between segment 108A and segment 110A of pair 106A. For each pair 106, to transition from the connect mode to the disconnect mode, a protrusion 130 is arranged to displace wedge plate segment 108 and wedge plate segment 110 circumferentially away from each other. In general, a reference character "[number][number][number][letter]" designates a specific example of an element labeled as "[number][number][number]." For example, segment 108A is a specific example from among segments 108.

Ramps 124 slope radially inwardly in circumferential direction CD1, about axis AR, and ramps 126 slope radially inwardly in circumferential direction CD2, opposite circumferential direction CD1. Each segment 108 includes radially outer ramp 132 sloping radially inwardly in circumferential direction CD1. Each segment 110 includes radially outer ramp 134 sloping radially inwardly in circumferential direction CD2. In an example embodiment, in the disconnect mode: ramps 132 are in contact with ramps 124; and ramps 134 are in contact with ramps 126. To transition from the connect mode to the disconnect mode, for each pair 106, a respective protrusion 130 is arranged to: contact surfaces 135 of segments 108 and 110; slide ramp 132 of wedge plate segment 108 radially outwardly and in circumferential direction CD2 along a ramp 124; and slide ramp 134 of wedge plate segment 110 radially outwardly and in circumferential direction CD1 along a ramp 126. For example, protrusion 130A slides: ramp 132A of segment 108A along ramp 124A; and ramp 134A of segment 110A along ramp 126A.

Disconnect 100 includes resilient elements 136. Each resilient element 136 is circumferentially disposed between and engaged with a respective wedge plate segment 108 and a respective wedge plate 110. For each pair 106: a respective element 136 is engaged with wedge plate 108; and a respective element 136 is engaged with wedge plate 108. For example, resilient element 136A is engaged with wedge plate segment 110A of pair 106A and resilient element 136B is engaged with wedge plate segment 108B of pair 106A. For each pair 106, to transition from the connect mode to the disconnect mode, a protrusion 130 is arranged to displace wedge plate segments 108 and 110 away each other to circumferentially compress resilient elements 136. For example protrusion 130A displaces wedge plate segments 108A and 110A away from each other to compress resilient elements 136A and 136B. In an example embodiment, resilient elements 136 contact segments 108 and 110.

In an example embodiment, disconnect 100 includes resilient element 137. To transition from the disconnect mode to the connect mode: actuator plate 114 is arranged to be displaced in direction D2, opposite direction D1, by actuator A, or actuator A is de-energized to enable displacement of cage 112 in axial direction AD2, opposite direction AD1; and resilient element 137 is arranged to displace actuator cage 112 in direction AD2, with respect to pairs 106; and cage 112 is arranged to displace actuator plate 116 in direction AD2. Then, for each pair 106: resilient elements 136 are arranged to displace wedge plate segment 108 and wedge plate segment 110 toward each other to increase frictional contact between the pair 106 and output race 104, or to contact output race 104 with the pair 106. For example, resilient element 136A displaces wedge plate segment 110A in direction CD2 and resilient element 136B displaces wedge plate segment 108A in direction CD1. In an example embodiment, direction D2 is opposite direction CD2.

To transition from the disconnect mode to the connect mode and for each pair 106, resilient elements 136 are arranged to: slide wedge plate segment 108 radially inwardly along a respective ramp 124 in circumferential direction CD1; and to slide wedge plate segment 110 along a respective ramp 126 in circumferential direction CD2. For example, resilient element 136B slides: segment 108A along ramp 124A in direction CD1, and resilient element 136A slides segment 110B along ramp 126A in direction CD2.

To transition from the connect mode to the disconnect mode: protrusions 130 displace segments 108 and 110 away from each other to compress resilient elements 136; and cage 112 compresses resilient element 137.

Disconnect 100 includes housing 138. At least a portion of output race 104 is located within housing 138. In an example embodiment, portion 140 of input hub 102 is located within housing 138, and portion 142 of input hub 102 is located outside of housing 138. Portion 142 is arranged to non-rotatably connect to axle AX1. In an example embodiment, an entirety of portion 142 is radially inward of wedge plate segments 108 and 110. In an example embodiment, pairs 106, cage 112, plate 114, plate 116, and resilient element 137 are disposed within housing 138.

To transition from the disconnect mode to the connect mode, resilient element 137 is arranged to displace actuator cage 112 and actuator plate 116 in axial direction AD2, with respect to input hub 102, race 104, and pairs 106. In an example embodiment: actuator plate 114 is axially fixed with respect to housing 138; and actuator plate 116 is rotationally fixed with respect to housing 138. That is: plate 114 is rotatable within housing 138 and cannot not displace axially within housing 138 (housing 138 precludes axial displacement of plate 114); and plate 116 is axially displaceable within housing 138 and cannot rotate within housing 138 (housing 138 precludes rotation of plate 116).

In an example embodiment: resilient element 137 is in contact with input hub 102 and to transition from the disconnect mode to the connect mode, resilient element 137 is arranged to displace actuator cage 112 and actuator plate 116 in axial direction AD2, with respect to input hub 102.

In an example embodiment, disconnect 100 includes thrust bearing 144 axially disposed between actuator cage 112 and actuator plate 116 and in contact with actuator cage 112 and actuator plate 116. Thrust bearing 144 enables cage 112 and protrusions 130 to rotate with wedge plate segments 108 and 110 and with respect to rotationally fixed plate 116. Thus, thrust bearing 144 transmits force in direction AD1 from plate 116 to cage 112 for the transition to the disconnect mode, while enabling relative rotation between plate 116 and cage 112.

In an example embodiment: output race 104 includes radially outer surface 146 with at least one circumferentially disposed groove 148; and each wedge plate segment 108 and 110 includes radially inner surface 150 with at least one protrusion 152 disposed in the at least one groove 148. To transition from the disconnect mode to the connect mode, frictional contact between protrusions 152 and output race 104 is increased, or contact between protrusions 152 and output race 104 is initiated. To transition from the connect mode to the disconnect mode, frictional contact between protrusions 152 and input output race 104 is decreased, or contact between protrusions 152 and output race 104 is broken. In an example embodiment, disconnect 100 includes bearing 154 engaged with input hub 102 and output race 104.

In an example embodiment: plate 114 includes ramps 156 sloping in axial direction AD1 along direction CD1; and plate 116 includes ramps 158 in contact with ramps 156 and sloping in axial direction AD1 along direction CD1. When actuator A rotates plate 114 in direction D1 (parallel to direction CD2 in the example of FIG. 2) to transition to the disconnect mode, ramps 156 slide along ramps 158, displacing plate 116 and cage 112 in direction AD1. To transition to the connect mode: when actuator A rotates plate 114 in direction D2, resilient element 137 displaces cage 112 and plate 116 in direction AD2, sliding ramps 158 along ramps 156; when actuator A is de-energized, resilient element 137 displaces cage 112 and plate 116 in direction AD2, sliding ramps 158 along ramps 156 to rotate plate 114 in direction D2.

The following provides further detail regarding the structure and operation of disconnect 100. Disconnect 100 is bi-directional. That is, disconnect 100 can transmit torque from input hub 102 and output race 104 in directions CD1 and CD2.

To transition from the disconnect mode to the connect mode for relative rotation of input hub 102, with respect to output race 104, in direction CD1, for example, torque is applied by axle AX1 to input hub 102 in direction CD1, for each pair 106, resilient elements 136 force wedge plate segment 108 and wedge plate segment 110 circumferentially toward each other. Thus, resilient elements 136 slide, or push: segments 108 radially inwardly along ramps 124 in direction CD1; and segments 110 radially inwardly along ramps 126 in direction CD2. Segments 108 frictionally engage output race 104 or increase existing frictional engagement with output race 104 (via protrusions 152 in grooves 148), blocking rotation of segments 108 with input hub 102 in direction CD1. Segments 110 rotate with input hub 102 and with respect to output race 104 in direction CD1.

Blocking rotation of segments 108 with input race 102 in direction CD1: causes input race 102 to rotate with respect to segments 108 in direction CD1; slides ramps 124 radially inwardly along ramps 132; compressively engages segments 108 between input hub 102 and output race 104; and non-rotatably connects input hub 102 and output race 104 with segments 108. By components "compressively engaged between" two elements, we mean that: one element exerts a normal force on the component, and the other element exerts an opposite normal force on the component. Thus, the two elements squeeze and lock the component between them.

Segments 110 slide radially outwardly along ramps 126. Thus, segments 110 are not compressively engaged between input hub 102 and output race 104 and are not non-rotatably connected with input hub 102 and output race 104. Once in the locked mode, input hub 102, output race 104, and segments 108 rotate together in direction CD1. As long as cage 112 remains displaced in direction AD2, disconnect 100 remains in the locked mode regardless of the direction of relative rotation of input hub 102 with respect to output race 104. For example, if torque is applied to input hub 102 in direction CD2, input hub 102 and output race 104 compressively engage segments 110 as described below.

To transition from the disconnect mode to the connect mode for relative rotation of input hub 102, with respect to output race 104, in direction CD2, for example, torque is applied by axle AX1 to input hub 102 in direction CD2, for each pair 106, resilient elements 136 force wedge plate segment 108 and wedge plate segment 110 circumferentially toward each other. Thus, resilient elements 136 slide, or push: segments 110 radially inwardly along ramps 126 in direction CD2; and segments 108 radially inwardly along ramps 124 in direction CD1. Segments 110 frictionally engage output race 104 or increase existing frictional engagement with output race 104 (via protrusions 152 in grooves 148), blocking rotation of segments 110 with input hub 102 in direction CD2. Segments 108 rotate with input hub 102 and with respect to output race 104 in direction CD2.

Blocking rotation of segments 110 with input race 102 in direction CD2: causes input race 102 to rotate with respect to segments 110 in direction CD2; slides ramps 126 radially inwardly along ramps 134; compressively engages segments 110 between input hub 102 and output race 104; and non-rotatably connects input hub 102 and output race 104 with segments 110.

Segments 108 slide radially outwardly along ramps 124. Thus, segments 108 are not compressively engaged between input hub 102 and output race 104 and are not non-rotatably connected with input hub 102 and output race 104. Once in the locked mode, input hub 102, output race 104, and segments 108 rotate together in direction CD2. As long as cage 112 remains displaced in direction AD2, disconnect 100 remains in the locked mode regardless of the direction of relative rotation of input hub 102 with respect to output race 104. For example, if torque is applied to input hub 102 in direction CD1, input hub 102 and output race 104 compressively engage segments 108 as described above.

As noted above, to transition from the connected mode to the disconnect mode, protrusions 130 slide segments 108 and 110 radially outwardly along ramps 124 and 126, respectively, and decrease frictional contact between wedge plate segments 108 and 110 and output race 104, or break contact between wedge plate segments 108 and 110 and output race 104. Thus, in the disconnect mode, segments 108 and 110 are able to rotate with input hub 102 and with respect to output race 104, without triggering the connect mode sequences described above.

In an example embodiment, disconnect 100 includes spring plate 160 engaged with plate 114. Spiral spring 162 is located between plates 114 and 160. Spring 162 enables rotational movement of plate 160 only if plate 116 is blocked from moving axially. In that instance, spring 162 winds up and forces plate 114 to rotate once the blockage is removed.

In an example embodiment: input hub 102 includes splines 164 arranged to non-rotatably connect to axle AX1; and output race 104 includes splines 166 arranged to non-rotatably connect to half-axle HAX1.

The following should be viewed in light of FIGS. 1 through 10B. The following describes a method of operating side axle disconnect 100 for an electrically-powered vehicle, for example vehicle V. Although the method is presented as a sequence of steps for clarity, no order should be inferred from the sequence unless explicitly stated. A first step, for a connect mode of side axle disconnect 100: non-rotatably connects, with pairs 106 of wedge plate segments 108 and 110, input hub 102 with output race 104; and transmits torque from an axle, for example axle AX1, non-rotatably connected to input hub 102, of a drive train, for example drive train DT1, of an electric motor, for example motor EM1, of a propulsion system, for example propulsion system PS, of electrically-powered vehicle V through side axle disconnect 100 to a wheel, for example wheel W1, of electrically-powered vehicle V, connected to a half-axle, for example half-axle HAX1, of the drive train. The half-axle is non-rotatably connected to output race 104.

To transition from the connect mode to a disconnect mode of side axle disconnect 100, a second step: displaces, with actuator A, actuator plate 114 in direction D1; displaces, with actuator plate 114 and in axial direction AD1, actuator cage 112; circumferentially displaces, with actuator cage 112, wedge plate segments 108 and wedge plate segments 110; decreases a frictional contact between pairs 106 and output race 104, or breaks contact between pairs 106 and output race 104; and enables relative rotation between input hub 102 and output race 104.

Circumferentially displacing wedge plate segments 108 and wedge plate segments 110 in the second step includes: for each wedge plate segment 108, sliding, with actuator cage 112, ramp 132 of the wedge plate segment 108 radially outwardly and in a first circumferential direction, for example, circumferential direction CD2, along a ramp 124 of input hub 102; and for each wedge plate segment 110, sliding, with actuator cage 112, ramp 134 of the wedge plate segment 110 radially outwardly and in a second circumferential direction, for example, circumferential direction CD1, along a ramp 126 of input hub 102.

A third step transitions from the disconnect mode to the connect mode by: displacing, with resilient element 137, actuator cage 112 in axial direction AD2; circumferentially displacing, with resilient elements 136, wedge plate segments 108 and wedge plate segments 110; increasing a frictional contact between pairs 106 and output race 104, or contacting output race 104 with pairs 106; and non-rotatably connecting input hub 102 and output race 104 with pairs 106.

Circumferentially displacing wedge plate segments 108 and wedge plate segments 110 in the third step includes: for each wedge plate segment 108, sliding ramp 132 radially inwardly and in circumferential direction CD1 along a ramp 124 of input hub 102; and for each wedge plate segment 110, sliding ramp 134 radially inwardly and in circumferential direction CD2 along a ramp 126 of input hub 102.

In an example embodiment, transitioning from the connect mode to the disconnect mode includes: rotating actuator plate 114 with actuator A; precluding axial displacement of actuator plate 114; displacing, with actuator plate 114, actuator plate 116 in axial direction AD1; precluding rotation of actuator plate 116; and displacing, with actuator plate 114, actuator cage 112 in axial direction AD1.

Side axle disconnect 100 and a method of using side axle disconnect 100 provide disconnecting means for a drive train of an electrically-powered vehicle that is a simpler and more cost-effective those known in the art. For example, side axle disconnect 100 enables a simpler actuation requirement, including lower actuation force and lower actuator stroke.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AD1 axial direction
AD2 axial direction
AR axis of rotation
AX1 axle
AX2 axle
CD1 circumferential direction
CD2 circumferential direction
D1 direction
D2 direction
DT1 drive train
DT2 drive train
EM1 electric motor
EM2 electric motor
HAX1 half-axle
HAX2 half-axle
PS propulsion
V electrically-powered vehicle
W1 wheel
W2 wheel
100 side axle disconnect
102 input hub
104 output race
106 pair, wedge plate segments
106A pair, wedge plate segments
108 wedge plate segment
108A wedge plate segment
110 wedge plate segment
110A wedge plate segment
112 actuator cage
114 actuator plate
116 actuator plate
118 resilient element
120 radially inner surface
124 ramp, Input hub
124A ramp, input hub
126 ramp, input hub
126A ramp, input hub
128 annular portion, actuator cage
130 protrusion, actuator cage
130A protrusion, actuator cage
132 radially outer ramp, segment 108
132A radially outer ramp, segment 108
134 radially outer ramp, segment 110
134A radially outer ramp, segment 110
135 surface, wedge plate segment
136 resilient element
136A resilient element
136B resilient element
137 resilient element
138 housing
140 portion, input hub
142 portion, input hub
144 thrust bearing
146 radially outer surface, output race
148 groove
150 radially inner surface, wedge plate segment
152 protrusion
154 bearing
156 ramp, plate 114
158 ramp, plate 116
160 spring plate
162 spiral spring
164 spline, input hub
166 spline, output race

The invention claimed is:

1. A side axle disconnect for an electrically-powered vehicle, comprising:
an input hub arranged to non-rotatably connect to an axle of a drive train of the electrically-powered vehicle, and including a radially inner surface with a plurality of ramps;
an output race arranged to non-rotatably connect to a half-axle of the drive train;
a plurality of pairs of wedge plate segments radially disposed between the input hub and the output race, each wedge plate segment including a ramp in contact with a respective ramp of the plurality of ramps;
an actuator cage;
a first actuator plate;
a second actuator plate axially disposed between the actuator cage and the first actuator plate;

a plurality of resilient elements; and,
a first resilient element engaged with the actuator cage, wherein:
for a connect mode of the side axle disconnect, the plurality of pairs of wedge plate segments is arranged to non-rotatably connect the input hub and the output race to transmit torque from an electric motor of the electrically-powered vehicle to a wheel of the electrically-powered vehicle connected to the half-axle;
in a disconnect mode of the side axle disconnect, relative rotation between the input hub and the output race is enabled; and,
to transition from the connect mode to the disconnect mode:
the first actuator plate is arranged to be displaced in a first direction by an actuator;
the first actuator plate is arranged to displace the actuator cage in a first axial direction; and,
the actuator cage is arranged to circumferentially displace the plurality of pairs of wedge plate segments to decrease a frictional contact between the plurality of pairs of wedge plate segments and the output race, or to break contact between the plurality of pairs of wedge plate segments and the output race;
each pair of wedge plate segments includes a first wedge plate segment and a second wedge plate segment;
each resilient element of the plurality of resilient elements is disposed between a respective first wedge plate segment and a respective second wedge plate segment;
to transition from the disconnect mode to the connect mode, each resilient element is arranged to circumferentially displace the respective first wedge plate segment and the respective second wedge plate segment away from each other; and,
to transition from the disconnect mode to the connect mode, the first resilient element is arranged to displace the actuator cage in a second axial direction, opposite the first axial direction, with respect to the plurality of pairs of wedge plate segments.

2. The side axle disconnect of claim 1, wherein to transition from the connect mode to the disconnect mode:
the first actuator plate is arranged to be rotated by the actuator;
the first actuator plate is arranged to displace the second actuator plate in the first axial direction; and,
the second actuator plate is arranged to displace the actuator cage in the first axial direction.

3. The side axle disconnect of claim 1, wherein:
each pair of wedge plate segments includes a first wedge plate segment and a second wedge plate segment;
the actuation cage includes a plurality of protrusions extending in the first axial direction;
each protrusion of the plurality of protrusions is disposed between a respective first wedge plate segment and a respective second wedge plate segment; and,
to transition from the connect mode to the disconnect mode, each protrusion is arranged to circumferentially displace the respective first wedge plate segment and the respective second wedge plate segment away from each other.

4. The side axle disconnect of claim 3, wherein:
the plurality of ramps includes a plurality of first ramps sloping radially inwardly in a first circumferential direction, and a plurality of second ramps sloping radially inwardly in a second circumferential direction, opposite the first circumferential direction; and,
to transition from the connect mode to the disconnect mode, each protrusion is arranged to slide the respective first wedge plate segment radially outwardly and in the second circumferential direction along a respective first ramp, and to slide the respective second wedge plate segment radially outwardly and in the first circumferential direction along a respective second ramp.

5. The side axle disconnect of claim 1, wherein:
the plurality of ramps includes a plurality of first ramps sloping radially inwardly in a first circumferential direction, and a plurality of second ramps sloping radially inwardly in a second circumferential direction, opposite the first circumferential direction; and,
to transition from the disconnect mode to the connect mode, each resilient element is arranged to slide the respective first wedge plate segment radially inwardly and in the first circumferential direction along a respective first ramp, and to slide the respective second wedge plate segment radially inwardly and in the second circumferential direction along a respective second ramp.

6. The side axle disconnect of claim 1, wherein to transition from the disconnect mode to the connect mode, each resilient element is arranged to circumferentially displace the respective first wedge plate segment and the respective second wedge plate segment away from each other to increase frictional contact between the plurality of pairs of wedge plate segments and the output race, or to contact the output race with the plurality of pairs of wedge plate segments.

7. The side axle disconnect of claim 1, wherein:
the first resilient element is in contact with the input hub; and,
to transition from the disconnect mode to the connect mode, the first resilient element is arranged to displace the actuator cage in the second axial direction with respect to the input hub.

8. The side axle disconnect of claim 1, wherein to transition from the disconnect mode to the connect mode, the actuator is arranged to displace the first actuator plate in a second direction, opposite the first direction.

9. The side axle disconnect of claim 1, further comprising:
a thrust bearing axially disposed between the actuator cage and the second actuator plate and in contact with the actuator cage and the second actuator plate.

10. The side axle disconnect of claim 1, further comprising:
a housing, wherein:
the input hub includes a first portion located within the housing, and a second portion located outside of the housing and arranged to non-rotatably connect to the axle; or,
the input hub includes a first portion located outside of the housing and arranged to non-rotatably connect to the axle; and,
an entirety of the first portion of the input hub is radially inward of the plurality of pairs of wedge plate segments.

11. The side axle disconnect of claim 1, further comprising:
a housing, wherein:
the first actuator plate and the second actuator plate are located within the housing;

the first actuator plate is axially fixed with respect to the housing;

the second actuator plate is rotationally fixed with respect to the housing; and, to transition from the connect mode to the disconnect mode, the first actuator plate is arranged to be rotated by the actuator to displace the second actuator plate in the first axial direction.

12. A method of operating a side axle disconnect for an electrically-powered vehicle, comprising:

for a connect mode of the side axle disconnect:

non-rotatably connecting, with a plurality of pairs of wedge plate segments of the side axle disconnect, an input hub of the side axle disconnect with an output race of the side axle disconnect, each pair including a first wedge plate segment and a second wedge plate segment; and, transmitting torque from an axle, non-rotatably connected to the input hub, of a drive train of an electric motor of the electrically-powered vehicle through the side axle disconnect to a wheel of the electrically-powered vehicle connected to a half-axle of the drive train, the half-axle non-rotatably connected to the output race; and, to transition from the connect mode to a disconnect mode of the side axle disconnect:

rotating, with an actuator, a first actuator plate of the side axle disconnect in a first circumferential direction;

precluding axial displacement of the first actuator plate;

displacing, with the first actuator plate, a second actuator plate of the side axle disconnect in a first axial direction;

precluding rotation of the second actuator plate;

displacing, with the second actuator plate and in the first axial direction, an actuator cage of the side axle disconnect;

circumferentially displacing the first wedge plate segments and the second wedge plate segments;

decreasing a frictional contact between the plurality of pairs of wedge plate segments and the output race, or breaking contact between the plurality of pairs of wedge plate segments and the output race; and, enabling relative rotation between the input hub and the output race.

13. The method of claim 12, wherein circumferentially displacing the first wedge plate segments and the second wedge plate segments includes:

for each first wedge plate segment, sliding, with the actuator cage, a ramp of the first wedge plate segment radially outwardly and in the first circumferential direction along a first ramp of the input hub; and, for each second wedge plate segment, sliding, with the actuator cage, a ramp of the second wedge plate segment radially outwardly and in a second circumferential direction, opposite the first circumferential direction, along a second ramp of the input hub.

14. The method of claim 12, further comprising:

transitioning from the disconnect mode to the connect mode by:

displacing, with a first resilient element of the side axle disconnect, the actuator cage in a second axial direction, opposite the first axial direction;

circumferentially displacing, with a plurality of resilient elements of the side axle disconnect, the first wedge plate segments and the second wedge plate segments;

increasing a frictional contact between the plurality of pairs of wedge plate segments and the output race, or contacting the output race with the plurality of pairs of wedge plate segments; and, non-rotatably connecting the input hub and an output hub of the side axle disconnect with the plurality of pairs of wedge plate segments.

15. The method of claim 14, wherein circumferentially displacing, with a plurality of resilient elements of the side axle disconnect, the first wedge plate segments and the second wedge plate segments includes, with the plurality of resilient elements:

for each first wedge plate segment, sliding a ramp of the first wedge plate segment radially inwardly and in the first circumferential direction along a first ramp of the input hub; and, for each second wedge plate segment, sliding a ramp of the second wedge plate segment radially inwardly and in a second circumferential direction, opposite the first circumferential direction, along a second ramp of the input hub.

16. A side axle disconnect for an electrically-powered vehicle, comprising:

an input hub arranged to non-rotatably connect to an axle of a drive train of the electrically-powered vehicle, and including a radially inner surface with a plurality of ramps;

an output race arranged to non-rotatably connect to a half-axle of the drive train;

a plurality of pairs of wedge plate segments radially disposed between the input hub and the output race;

an actuator cage including a plurality of protrusions extending in a first axial direction;

a first actuator plate;

a second actuator plate; and, a thrust bearing axially disposed between the actuator cage and the second actuator plate and in contact with the actuator cage and the second actuator plate, wherein:

each pair of wedge plate segments of the plurality of pairs of wedge plate segments includes a first wedge plate segment and a second wedge plate segment;

each first wedge plate segment includes a radially outer surface with a ramp in contact with a respective ramp of the plurality of ramps;

each second wedge plate segment includes a radially outer surface with a ramp in contact with a respective ramp of the plurality of ramps;

for each pair of wedge plate segments, a protrusion of the plurality of the plurality of protrusions is disposed between the first wedge plate segment and the second wedge plate segment;

for a connect mode of the side axle disconnect, the plurality of pairs of wedge plate segments is arranged to non-rotatably connect the input hub and the output race to transmit torque from an electric motor of the electrically-powered vehicle to a wheel connected to the half-axle;

in a disconnect mode of the side axle disconnect, relative rotation between the input hub and the output race is enabled; and, to transition from the connect mode to the disconnect mode:

the first actuator plate is arranged to be rotated by an actuator in a first circumferential direction;

the first actuator plate is arranged to displace the second actuator plate in the first axial direction;

the second actuator plate is arranged to displace the actuator cage in the first axial direction; and, a protrusion of the plurality of protrusions is arranged to circumferentially displace the first wedge plate segment and the second wedge plate segment radially outwardly and away from each other to decrease a frictional contact between the plurality of pairs of wedge plate segments and the output race, or to break contact between the plurality of pairs of wedge plate segments and the output race.

17. The side axle disconnect of claim 16, further comprising:

a first resilient element; and,
a plurality of resilient elements, wherein:
for each pair of wedge plate segments:
  a respective first resilient element of the plurality of resilient elements is engaged with the first wedge plate segment;
  a respective second resilient element of the plurality of resilient elements is engaged with the second wedge plate segment;
to transition from the disconnect mode to the connect mode:
  the first actuator plate is arranged to be rotated in a second circumferential direction, opposite the first circumferential direction, by the actuator;
  the first resilient element is arranged to displace the actuator cage in a second axial direction, opposite the first axial direction;
  the respective first resilient element is arranged to displace the first wedge plate segment toward the second wedge plate segment; and,
  the respective second resilient element is arranged to displace the second wedge plate segment toward the first wedge plate segment.

* * * * *